Aug. 25, 1959     J. K. POLHEMUS     2,901,692
TESTING DEVICE FOR CAMERAS AND FLASHLAMPS
Filed Nov. 14, 1956
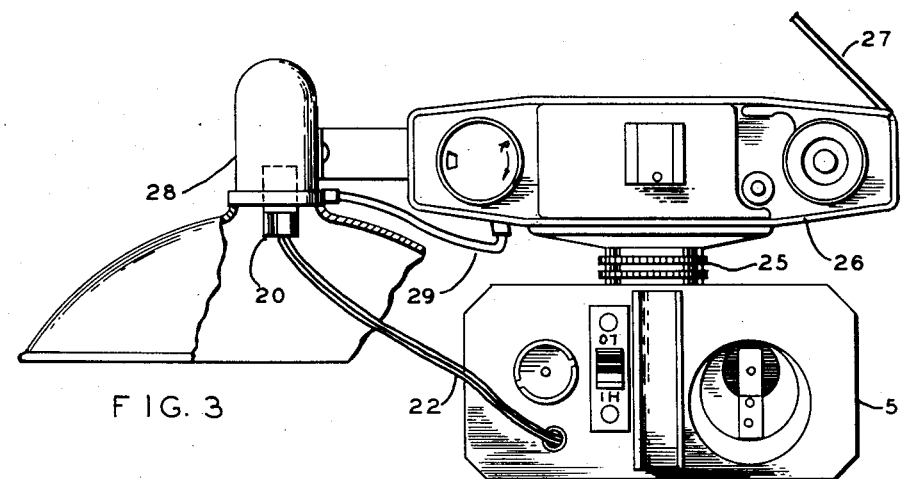
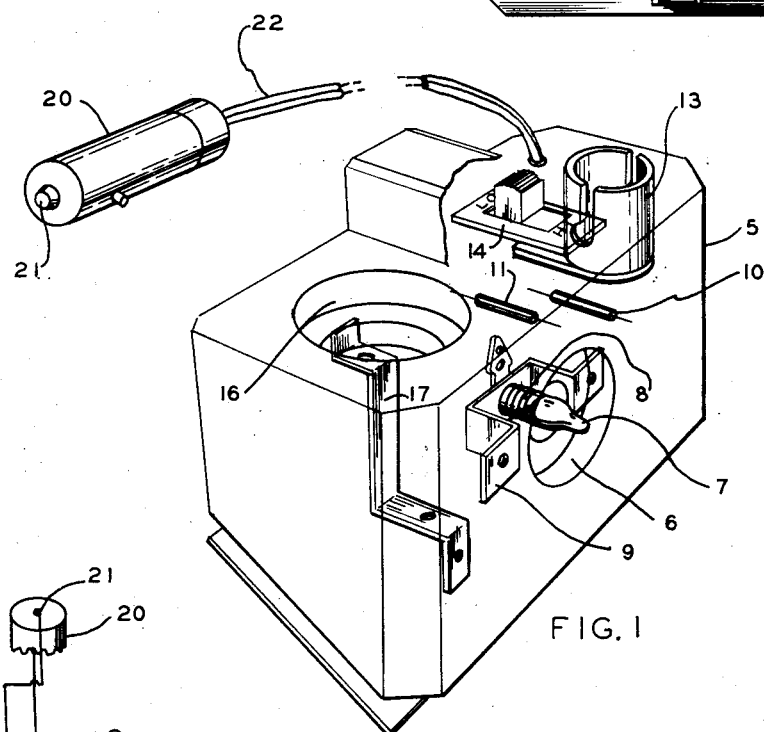
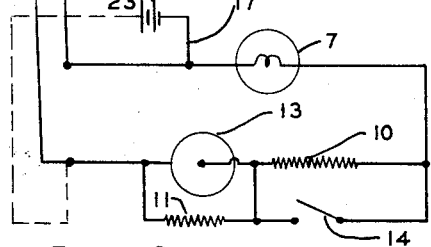
INVENTOR
JOHN K. POLHEMUS
BY
ATTORNEYS 2,901,692

TESTING DEVICE FOR CAMERAS AND FLASHLAMPS

John Kenneth Polhemus, Endwell, N.Y., assignor to General Aniline & Film Corporation, New York, N.Y., a corporation of Delaware Application November 14, 1956, Serial No. 622,047

2 Claims. (Cl. 324—51)

This invention relates to testing apparatus and more particularly to simple testing attachments for photographic cameras and flash units.

In many instances, it is desirable to determine whether the shutter of the camera is properly synchronized so as to accommodate the switch at the right time for igniting the photoflash bulb. At times, it is also advantageous to make tests of the continuity of the circuit, including the photoflash bulb filament.

Various types of elaborate devices for testing the synchronization of a camera shutter have been proposed which operate with great precision. However, the object of the present invention is chiefly to provide a simple, inexpensive attachment which can be used by anyone to obtain a fairly accurate test of the shutter function.

Another feature of the testing attachment, in accordance with the invention, is that it may be used to test the battery or the photoflash bulb itself without the camera.

Other objects and features will be apparent from the following description of the invention, pointed out in particularity in the appended claims and taken in connection with the accompanying drawings in which:

Fig. 1 is the general outline of the testing attachment in a phantom view;

Fig. 2 is the simple circuit of the attachment shown in Fig. 1; and

Fig. 3 shows the testing attachment in combination with a camera and its associated flash gun for observing the synchronous operation of the shutter action.

Referring to the figures, the attachment comprises an oblong support 5 which may be of any suitable material, such as plastic or wood. Mounted therein, behind a recessed aperture 6, is a miniature electric lamp 7 which is preferably of the pen-light type to give a sharply defined pinpoint light source. The lamp 7 is mounted in a suitable socket 8 which is held by a bracket 9 inside the support 5. The aperture 6 is so dimensioned that it will fit over the lens of the camera to be tested.

Two resistors 10 and 11 are placed within the support 5 and connected in circuit with the lamp and with a socket 13 mounted on the support 5 and also with the switch 14, in the manner shown in Fig. 3 which will be described later.

A compartment 16 is provided in the support 5 to accommodate various types of flash light cells, there being a contact bracket 17 inside the recess 16 and extending inwardly for the circuit connection with the other units of the assembly.

A plug 20 of the bayonet type which fits the conventional flash light socket is attached by means of a cord 22 to the support 5, the electrical connections being effected therewithin, as shown in the schematic diagram of Fig. 2 wherein identical reference characters denote similar components as shown in Fig. 1. It is seen that the circuit comprises, between terminals of the plug 20, in series, the lamp 7, the resistor 10, and the socket 13. In shunt with the resistor 10 is the switch 14 and in shunt with socket 13 is the resistor 11. The purpose of the resistors is to control the current through the filament of the lamp 7 in accordance with the particular source of voltage used and provide continuity across the socket 13, the source of voltage depending upon the number of dry cells the flashlamp may have.

The connection shown in dotted line in Fig. 2 indicates the circuit when a battery 23, such as used in flash equipment, is tested individually. In such case, the battery 23 is inserted into the compartment 16 so that its center contact rests on the transverse portion of the bracket 17. The circuit is completed when the center terminal 21 of the plug 20 is placed in electrical contact with the free terminal of the battery 23. The glow of the lamp 7 will thus indicate the condition of the battery 23. The resistor 10 may be left in the circuit or may be shunted by the switch 14, depending upon the current requirement of the lamp 7 and the voltage rating of the battery 23.

Fig 3 shows the use of the attachment for checking the flash synchronization of the camera shutter. The support 5 is placed against the lens 25 of the camera 26 so that the lamp 7 is in the center of the lens. The back 27 of the camera is opened, whereby one may observe the backside of the lens 25 and thus the working of the shutter. The plug 20 is inserted into the socket of the associated flashlamp 28 of the camera 26 which is also connected to the camera shutter switch in the conventional manner by the cord 29. When the shutter is actuated, the circuit is completed through the synchronizing switch and the batteries housed in the flash light (not shown here). The current thus must flow through the lamp 7, the ignition of which, observed from the back of the camera, indicates proper synchronization of the shutter. If the light is not seen through the shutter as it is momentarily opened, the synchronization of the camera is faulty.

For testing the continuity of the flash synchronizing circuit, and also the continuity of the igniter of the flash bulb, the latter may be inserted into the socket 13 and the plug 20 placed into the flashlamp of the camera as before. The closure of the switch in the camera will indicate, when the lamp is lit, that the flash bulb in the socket 13 has proper igniter continuity. Since the filament of the flash bulb shunts the resistor 11, the switch 14 is kept open for this particular test and the resistor 10 modifies the current through the lamp 7 so that the filament thereof will not burn out. The shunt resistor 11 is so proportioned that it has a considerably higher resistance than the igniter of the flash bulb. Therefore, if the flash bulb is defective, the current through both resistors is inadequate to light the lamp 7 to full brilliancy.

In combination with certain cameras of the box type, where the back cannot be opened, the housing 5 may be inserted within the camera and the lighting of the lamp 7 observed from the front of the lens, for example, in the camera marketed under the trade name "Readyflash."

I claim:

1. A testing attachment for use in connection with photoflash accessories and cameras comprising a support containing as components, a miniature electric lamp bulb, a socket for accommodating a flash bulb, a switch, a compartment accommodating a flashlight battery, an electric contact terminal in said compartment, an electrical plug suitable for sockets used for flash bulbs connected to said support by a flexible cord, electrical connections between said components including a resistor in series between one terminal of said bulb and said socket and in parallel with said switch, another resistor in parallel with terminals of said socket, both said lamp and said socket being in series between leads connected to said plug, said electric contact terminal being connected to the junction point of said lamp bulb and said plug.

2. A testing attachment in accordance with claim 1 wherein said lamp bulb is mounted at the bottom of a cylindrical recess in said support, said recess being of such diameter as to accommodate the lens mount of a camera.

References Cited in the file of this patent

UNITED STATES PATENTS

| | | |
|---|---|---|
| 2,475,104 | McGall | July 5, 1949 |
| 2,543,860 | Lovi et al. | Mar. 6, 1951 |
| 2,620,379 | Zimmerman | Dec. 2, 1952 |